March 25, 1952  P. S. HARPER  2,590,535
GAS VALVE
Filed Feb. 7, 1945  2 SHEETS—SHEET 1
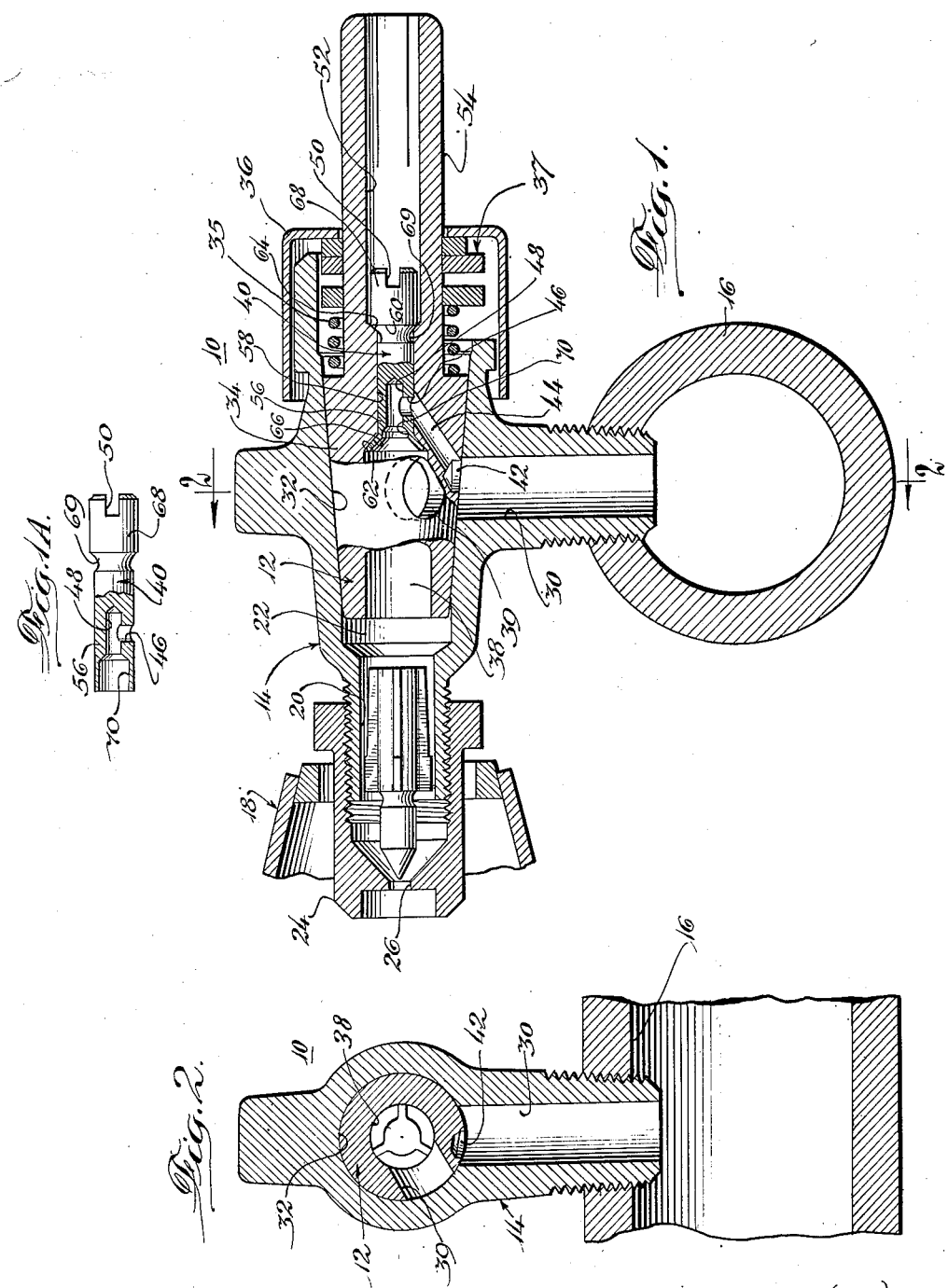

March 25, 1952     P. S. HARPER     2,590,535
GAS VALVE
Filed Feb. 7, 1945     2 SHEETS—SHEET 2
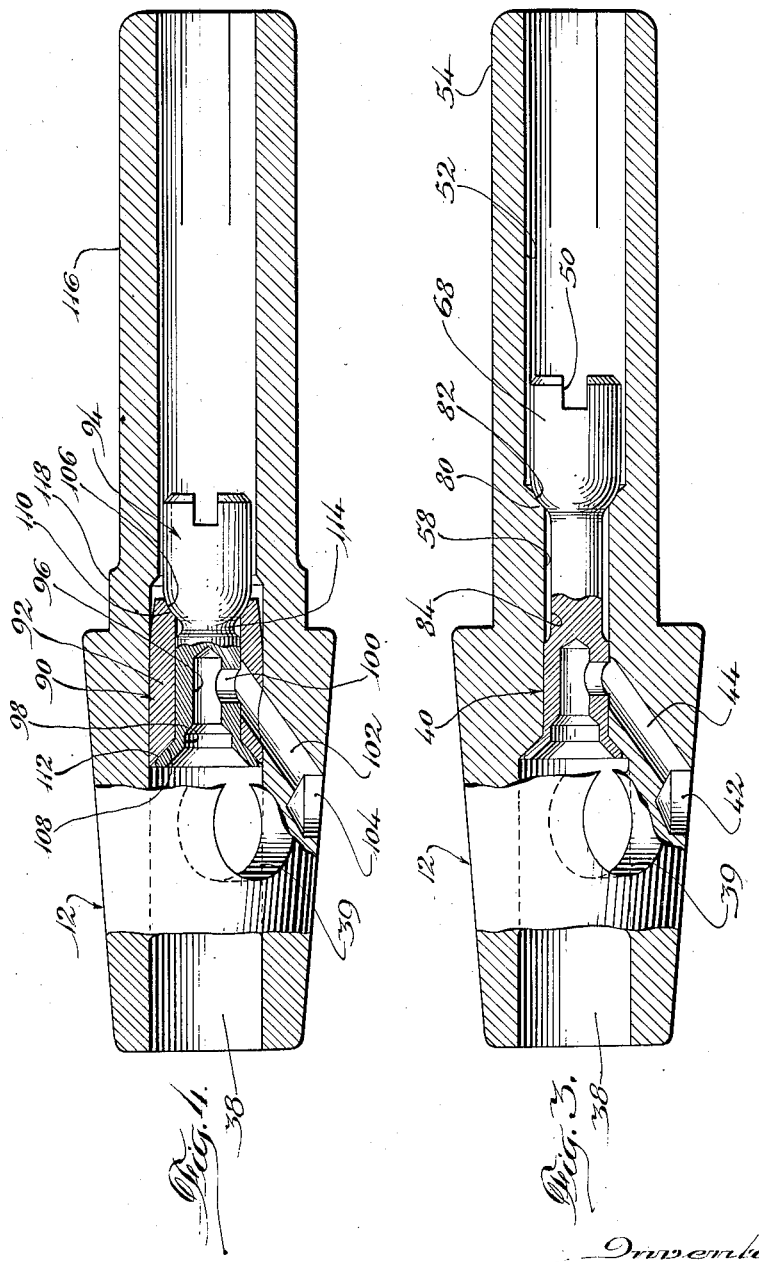

Patented Mar. 25, 1952

2,590,535

UNITED STATES PATENT OFFICE 2,590,535

GAS VALVE

Philip S. Harper, Chicago, Ill., assignor to Harper-Wyman Company, Chicago, Ill., a corporation of Illinois Application February 7, 1945, Serial No. 576,673

8 Claims. (Cl. 277—41)

The present invention pertains to gas valves and particularly to gas valves of the type operable to different positions to supply different amounts of gas to gas burners and the like, and one type of which is commonly called a high-low valve.

The primary object of the present invention is to provide a gas valve having new and improved means accessible through the valve stem for adjusting the flow of gas in one, and preferably the low, position of the valve.

Another object of the present invention is to provide a new and improved non-leaking stem adjustment plural position valve.

A further object of the present invention is to provide a new and improved stem adjustment type plural position valve which is of simple and foolproof construction and in which the adjustment means can be readily and permanently assembled into the valve stem.

Another object of the present invention is to provide a new and improved stem adjustment plural position valve wherein the stem adjustment means comprises a one piece auxiliary valve rotatably mounted within the valve stem and so constructed and arranged that the valve can readily be made to have the proper amount of frictional resistance against turning, whereby it may be both easily and permanently adjusted.

A still further object of the present invention is to provide a new and improved stem adjustment type valve wherein the adjustment means includes parts which may be readily machined to the high degree of accuracy necessary and desirable for non-leaking and low turn-down operation.

Another object of the present invention is to provide a new and improved stem adjustment type valve in which the stem adjustment means consists of parts which may be easily and accurately made in quantity production by conventional machinery, such as screw machines, and which may be assembled into a unit for insertion in a bore or passageway within the valve plug and which can be fixedly secured to the plug readily as by a press fit.

Another object of the present invention is to provide a new and improved stem adjustment type plural position valve including an auxiliary valve constructed to facilitate alignment of the parts, better to insure a gastight seal.

Still another object of the present invention is to provide a new and improved stem adjustment means including an auxiliary valve having a pair of opposed seating surfaces cooperating with associated seats in the valve plug, which seating surfaces are urged together in permanent gastight relation by spinning a counterbored end of the auxiliary valve against one of the shoulders.

Other objects and advantages of the present invention will become apparent from the ensuing description thereof, in the course of which reference is had to the accompanying drawings, in which Fig. 1 is an axial cross-sectional view through a valve constructed in accordance with the present invention, the valve operating handle being omitted for the sake of simplicity;

Fig. 1-A is a plan view, partly broken away, of an auxiliary valve forming a salient feature of the stem adjustment means shown in Fig. 1;

Fig. 2 is a vertical transverse cross-sectional view taken along the line 2—2 of Fig. 1;

Fig. 3 is an axial cross-sectional view through a modified form of valve plug constructed in accordance with the present invention; and Fig. 4 is a view similar to Fig. 3 of another embodiment of the invention.

The present invention has been illustrated in conjunction with a plural position gas valve 10 of the type commonly called a high-low valve. The valve includes a rotatable tapered valve plug 12 movable from an off position, wherein no gas flows through the valve, to high and low positions wherein different quantities of gas flow to the burner. In the high position a larger quantity of gas flows to the burner and in the low position a smaller quantity of gas flows to the burner.

Gas valves are installed in different localities having different types of gas as well as supplies available only at different pressures. These differences do not materially affect the operation of the valve or of its associated burner when the valve is in its high position, but difficulties may be encountered when the valve is operated to its low position. This makes it desirable that some means be provided for adjusting the quantity of gas which flows through the valve to the burner in the low position. It is desirable that the adjustment means be simple, efficient, inexpensive, and readily accessible even after the valve has been assembled in the stove or the like with which it is intended to be used. All of these requirements are fulfilled by the low adjustment means of the present invention, which will now be described in detail.

The gas valve includes the previously mentioned rotatable plug 12 and a valve body 14 within which the plug is mounted in conventional manner. Gas is supplied to the valve from a suitable source of gas through a manifold 16 and regulated quantities of gas are supplied to a burner, not shown, which is connected to the valve through a mixing tube 18, which may be of conventional construction. The gas valve includes an outlet passageway 20 communicating with an outlet chamber 22 from which gas flows into the mixing tube through a hood 24 having an orifice 26. The hood is adjustable, in order that the effective area of the orifice may be varied, as is conventional in gas valves.

The gas valve includes an inlet passageway 30 providing communication from within the manifold 16 to a tapered bore or passageway 32 within which the tapered inner portion 34 of the valve plug is rotatably mounted. The valve plug is held in place by a spring 35 bearing against the portion 34 and an end cap 36 detachably secured to the valve body. A plural element position indicating and determining mechanism 37 is located between the spring and the cap. It forms no part of the present invention and may take various forms.

The valve plug includes an axial outlet passageway 38 communicating with the outlet chamber 22 and with a radial passageway 39 leading to the exterior of the plug so constructed and arranged that when the plug is turned into an angular position such that the passageways 30 and 39 are in alignment a "high" quantity of gas flows to the burner through the valve. The quantity of gas flowing to the valve through the passageway 39 may be regulated in a "turn-down range" by adjusting the angular position of the plug thereby to control the effective size of the passageway 39.

In the low position of the valve a smaller and preadjusted quantity of gas is supplied to the burner through the low adjustment means constituting the primary feature of the present invention. This means includes an auxiliary valve 40 movable to regulate the effective area of a passageway interconnecting the inlet passageway 30 and the axial outlet passageway 38 in the low position of the valve. In this position gas flows from the inlet passageway 30 to the axial passageway 38 through the generally radial passageways 42 and 44 in the portion 34 of the valve plug and passageway defining means including the radial and axial passageways or bores 46 and 48 in the auxiliary valve 40. The axial bore 48 opens to the axial passageway 38 in the valve plug while the bore 48 interconnects the former and the angularly disposed passageway 44.

The adjustment of the quantity of gas flowing through the gas valve in the low position of the valve is effected by turning the auxiliary valve 40, thereby to regulate the effective size of an orifice formed by the positional relationship of the passageways 44 and 46 in the plug and auxiliary valve respectively. In order that the auxiliary valve may be adjusted through the stem, the valve is provided with a diametrical slot 50 at its outer end which is accessible through the hollow outer portion 52 of the valve stem 54. A handle, not shown, is adapted to be secured to the valve stem for rotating the valve plug. When the handle is removed the auxiliary valve 40 is made accessible to an instrument such as a screw driver.

The auxiliary valve is so constructed and so adapted to be secured within the valve plug that it may be made in large quantities by conventional machining processes, such as in screw machines and the like. It includes a central smaller diameter portion 46 having a very close fit in a bore or passageway 58 in the valve plug interconnecting the outlet passageway 38 and the hollow portion 52 of the stem. The auxiliary valve is very easily secured in place and a very good gas seal is provided by a pair of opposed sealing and holding surfaces 60 and 62 in the auxiliary valve which cooperate with shoulders 64 and 66 formed at the opposite ends of the bore 58 interconnecting the axial passageway 38 and hollow portion 52 of the stem. The sealing surface 60 is made at the inner end of the head portion 68 of the auxiliary valve, which has a diameter somewhat smaller than the diameter of the hollow portion 52. The surface 60 is extended beyond the surface 64 as indicated by the reference 69 in order to insure an effective sealing action. The sealing surface 62 is formed as by a spinning operation after the auxiliary valve has been inserted within the valve plug.

The auxiliary valve is shown in Fig. 1–A prior to insertion within the valve plug. It will be noted that it has a counterbore 70 at its inner end of a diameter larger than that of bore 48. Thus, after the valve has been inserted in place, this end is spun to bring the sealing surfaces into engagement with each other. The construction is such that the auxiliary valve can be made simply and economically and can be assembled in the valve plug to provide a non-leaking, one piece stem adjustment means.

The proper amount of frictional resistance desirable for easy and permanent adjustment can be obtained during the spinning operation. Furthermore, the auxiliary valve adjusts itself on its seats to provide an efficient gastight seal.

The embodiment of the invention illustrated in Fig. 3 is closely similar to that described above. It differs, however, mainly in that a ball seat is provided between the sealing surfaces at the handle end of the auxiliary valve. The sealing surfaces are provided by the spherical shoulder 80 at the junction of the hollow portion 52 of the stem and the interconnecting bore 58 and a spherical sealing surface 82 at the inner end of the head 68 of the auxiliary valve 40.

To insure efficient sealing action in spite of small inaccuracies which might result during machining of the valve stem and auxiliary valve, the central portion 84 of the auxiliary valve is made of somewhat smaller diameter than the interconnecting bore 58, thereby to facilitate accurate alignment in spite of small dimensional inaccuracies.

The stem adjustment means illustrated in Fig. 4 possesses the advantage that it is assembled into a unit prior to insertion within the valve plug. This is a decided advantage because of the smallness of the parts, because it enables the manufacture to be carried on more readily, and does not require as much machining of the valve plug. Referring now to the figure, the unit, illustrated as a whole by reference character 90, includes a stationary tubular insert 92 in which the rotatable auxiliary valve member 94 is rotatably mounted. After construction and assembly of the unit, the unit is pressed within an axial bore, preferably the larger diameter outlet passageway 38, of the valve plug 12 whereby the unit is fixedly secured within the plug with the slotted end of member 94 loosely fitting in the smaller diameter hollow portion 52 of the valve stem.

The mounting of the stem adjustment unit within the outlet passageway makes it desirable to shorten the length of the auxiliary valve. The auxiliary valve includes an axial bore 96, a counterbore 98 and a radial bore 100 providing communication with a generally radial passageway 102 in the valve plug communicating with the radial bore 104.

The auxiliary valve 94 is rotatably supported by holding and sealing surfaces 106 and 108 at the ends of the valve and sealing surfaces 110 and 112 at the ends of the tubular insert 92. The surfaces 106 and 110 are preferably spherical and the surface 106 is extended somewhat to provide a reduced diameter portion 114 in the valve member, which corresponds to the portion 69 of the embodiment of Fig. 1. The sealing surface 108 is formed by spinning the inner end of the auxiliary valve just as in the previously described embodiments.

In order to provide adequate strength in spite of the extension of the length of the axial passageway 38 and because of the increased diameter of the hollow portion, the valve stem 116 is made of somewhat larger diameter and it is provided with a shoulder 118 at its inner end.

The adjustment of the flow of gas in the low position with the arrangement of Fig. 4 is the same as with the previously described arrangement so that further description thereof is not deemed to be necessary. It may be noted, however, that with the construction of Fig. 4, the auxiliary valve and sleeve are first machined individually and both may be machined within close tolerances in quantity production, as in screw machines. They are then assembled readily into a unit which can be inserted within a valve plug, which need not be machined to such close tolerances.

While the present invention has been described in connection with details of various embodiments thereof, it should be understood that such details are not intended to be limitative of the invention, except in so far as set forth in the accompanying claims.

Having thus described my invention, what I claim as new and desire to secure by Letters Patent of the United States is:

1. A gas valve including a rotatable valve plug having an axial outlet passageway, a hollow stem, a substantially uniform diameter passageway smaller than said outlet passageway and hollow portion of the stem interconnecting them, and a pasageway from the exterior of the plug to said interconnecting passageway, opposed sealing shoulders at the ends of said interconnecting passageway, and an auxiliary rotatable valve rotatably mounted in said interconnecting passageway, said valve having a portion of substantially uniform diameter in said first mentioned passageway, said portion having a passageway adapted to interconnect the passageway leading to the exterior of the plug valve and the outlet passageway, and sealing surfaces engaging each shoulder for rotatably securing said auxiliary valve within said plug valve.

2. In a gas valve of the type including a rotatable valve plug having an axial outlet passageway, a hollow stem, a passageway smaller than said outlet passageway and hollow portion of the stem interconnecting them, and a passageway from the exterior of the plug to said interconnecting passageway, the combination including, a tubular member defining said interconnecting passageway, opposed seal defining shoulders at the ends of said tubular member, and an auxiliary valve mounted in said member, said auxiliary valve having a passageway adapted to interconnect the passageway leading to the exterior of the plug valve and the outlet passageway, and sealing surfaces engaging each shoulder for rotatably securing said auxiliary valve within said member.

3. A stem adjustment gas valve of the type operable into one position for supplying a predetermined small quantity of gas and including a rotatable valve member, including in combination, a passageway having small and larger diameter portions extending through said member, and a plural part preassembled adjustable auxiliary valve unit having portions fitting into both portions of said passageway and insertable into said passageway through the larger diameter portion, said valve unit being adjustable to predetermine the flow of gas in the said one position.

4. A stem adjustment gas valve including a valve plug having an axial outlet passageway and a main radial passageway, a hollow stem and an interconnecting passageway between the hollow stem and outlet passageway, a secondary passageway leading from the exterior of said plug to said interconnecting passageway, a tubular member insertable into said interconnecting passageway having a radial passageway therein communicating with said secondary passageway, a rotatable valve rotatably mounted within said tubular member and forming a unit with the latter, said rotatable valve having a passageway adapted to communicate with said radial passageway in said tubular member and an outlet end with an outlet passageway communicating with the axial outlet passageway in said plug, and sealing means for preventing leakage of gas between said tubular member and rotatable valve comprising engaging surfaces on said member and valve, the surface of said member facing the outlet end of the plug and the surface on said valve facing in the opposite direction.

5. In a stem adjustment valve operable into one position for supplying a predeterminable small quantity of gas and including a rotary valve member having a passageway accessible from the exterior of the valve member, gas flow adjustment means in said passageway including a structure adjustable from the exterior of the valve member through said passageway to supply a low and predetermined quantity of gas in the said one position, said structure comprising a sub-assembly of two relatively rotatable elements, one of which is tubular and the other of which extends through said one and has a metering portion and a portion engageable as by a tool for adjustment purposes, and means securing said parts into a unitary structure, whereby said structure can be placed into said passageway as a unit and manufacture and assembly of the valve as a whole is facilitated.

6. In a gas valve, structure defining a first passageway accessible from the exterior of the valve member and a second passageway transverse to and opening into the first, gas flow adjustment means in said first passageway including structure adjustable from the exterior of the valve member through said first passageway to supply a low and adjustable predetermined quantity of gas through said first and second passageways, said structure comprising a sub-assembly of relatively rotatable elements, one of which elements is tubular and has a transverse passageway communicating with said second passageway and another of which elements extends through said one and has a metering portion cooperating with said transverse passageway in said tubular element and a portion engageable as by a tool for adjustment purposes, said sub-assembly including also means securing said elements into a unitary structure and said tubular member being dimensioned to be press fitted into said first passageway, whereby said structure can be placed into said first passageway as a unit and manufacture and assembly of the valve as a whole is facilitated.

7. In a gas valve, the combination including, structure defining a first passageway and a second passageway transverse to and opening into the first, and an adjustable and preassembled valve unit mounted within said first passageway, said valve unit including a tubular member having a radial passageway therethrough and mounted in said first passageway so as to provide communication between said radial and second passageways, a rotatable valve member mounted in said tubular member and accessible through said first passageway, said rotatable valve member having structure cooperating with said radial passageway to adjust the flow of gas therethrough, and means including interengaging structures on and integral with said tubular and rotatable valve members for holding them in assembled relation.

8. An auxiliary gas valve unit for insertion into a first passageway having a transverse passageway communicating therewith, including in combination, a tubular member of uniform circular outside diameter and having a transverse passageway intermediate its ends, said member being insertable into the first mentioned passageway so as to align said transverse passageways, and an adjustable rotatably movable valve member mounted in said tubular member and having a maximum dimension less than the outside diameter of said tubular member, said valve member including structure cooperating with said transverse passageway in said tubular member to regulate the flow of gas through the transverse passageway in the latter.

PHILIP S. HARPER.

REFERENCES CITED

The following references are of record in the file of this patent:

UNITED STATES PATENTS

| Number | Name | Date |
| --- | --- | --- |
| 1,780,525 | Jacobsen | Nov. 4, 1930 |
| 2,138,767 | Matthews | Nov. 29, 1938 |
| 2,249,982 | Rutherford | July 22, 1941 |
| 2,257,886 | Mueller | Oct. 7, 1941 |
| 2,288,913 | Moecker | July 7, 1942 |
| 2,384,078 | Curtis | Sept. 4, 1945 |

FOREIGN PATENTS

| Number | Country | Date |
| --- | --- | --- |
| 30,239 | Great Britain | of 1911 |